(12) United States Patent
Biggel

(10) Patent No.: US 9,056,723 B2
(45) Date of Patent: Jun. 16, 2015

(54) BELT CONVEYOR HAVING A VARIABLE-LENGTH BELT SUPPORT

(75) Inventor: Andreas Biggel, Hergatz (DE)

(73) Assignee: Hochland SE, Heimenkirch (DE)

(*) Notice: Subject to any disclaimer, the term of this patent is extended or adjusted under 35 U.S.C. 154(b) by 10 days.

(21) Appl. No.: 13/877,796

(22) PCT Filed: Sep. 14, 2011

(86) PCT No.: PCT/EP2011/065899
§ 371 (c)(1),
(2), (4) Date: Apr. 4, 2013

(87) PCT Pub. No.: WO2012/045553
PCT Pub. Date: Apr. 12, 2012

(65) Prior Publication Data
US 2013/0199899 A1    Aug. 8, 2013

(30) Foreign Application Priority Data
Oct. 7, 2010   (DE) .......................... 10 2010 047 562

(51) Int. Cl.
B65G 21/14    (2006.01)
B65G 15/60    (2006.01)
B65G 47/31    (2006.01)

(52) U.S. Cl.
CPC ............... *B65G 15/60* (2013.01); *B65G 21/14* (2013.01); *B65G 47/31* (2013.01)

(58) Field of Classification Search
USPC ................................................. 198/812, 594
See application file for complete search history.

(56) References Cited

U.S. PATENT DOCUMENTS

| | | | |
|---|---|---|---|
| 2,678,125 A * | 5/1954 | Bonney, Jr. .................. | 198/812 |
| 3,133,386 A | 5/1964 | Johnston | |
| 3,370,693 A * | 2/1968 | Marsden ................... | 198/460.2 |
| 4,900,062 A | 2/1990 | Maggi | |
| 5,046,603 A * | 9/1991 | Odenthal ..................... | 198/812 |
| 5,191,965 A | 3/1993 | Scheid | |
| 5,322,154 A * | 6/1994 | Lenherr ..................... | 198/460.2 |
| 5,938,004 A * | 8/1999 | Roberts et al. ............... | 198/812 |
| 6,341,685 B1 | 1/2002 | Spatafora et al. | |
| 6,935,487 B2 * | 8/2005 | Schaum et al. .............. | 198/812 |
| 2004/0094391 A1 | 5/2004 | Schaum et al. | |

FOREIGN PATENT DOCUMENTS

| | | |
|---|---|---|
| DE | 932117 | 8/1955 |
| DE | 1209054 | 1/1966 |
| DE | 7826035 U1 | 8/1986 |
| JP | S53-147382 A | 12/1978 |
| JP | S59-116312 U | 8/1984 |
| JP | S63-065641 U | 4/1988 |
| JP | H06-024545 A | 2/1994 |

* cited by examiner

*Primary Examiner* — William R Harp
(74) *Attorney, Agent, or Firm* — Stolmar & Partner; Robert Lelkes

(57) ABSTRACT

The invention relates to a device for transporting individual products (1) of, in particular, predefined dimensions in a transport direction A, wherein the device includes two upper belt segments (2, 3) adjacent to each other at a transition point (8), having variable length in the transport direction and each extending from an inner deflection (7, 8) at the transition point (6) to an outer deflection (9, 10) at the other end, wherein the two upper belt segments (2, 3) each are supported by a plurality of support means (11) spaced apart from each other in the transport direction, the distance between same changing as the length of the upper belt segments (2, 3) varies.

6 Claims, 2 Drawing Sheets

BELT CONVEYOR HAVING A VARIABLE-LENGTH BELT SUPPORT

CROSS-REFERENCE TO RELATED APPLICATIONS

This application is the §371 national phase of international application no. PCT/EP2011/065899 filed on Sep. 14, 2011, which claims priority from German patent application no. 10 2010 047 562.9 filed on Oct. 7, 1010.

FIELD OF THE INVENTION

The invention relates to a belt conveyor for conveying individual products, in particular foodstuffs such as stacks of processed cheese slices that, in particular, have a specified dimension in a transport direction, wherein the belt conveyor comprises two upper belt sections, which adjoin one another at a transfer point, have a variable length in the transport direction, and each extend from an inner deflector formed at the transfer point to an outer deflector formed at the other end.

BACKGROUND OF THE INVENTION

Such belt conveyor devices having a displaceable transfer point between two upper belt sections for changing the lengths are known per se. As is the case with the device shown in DE 43 41 044, for example, these are used in food processing operations for "formatting", in order to line up products that are lying on the belt with nonuniform spacing into a uniform sequence on the discharge section of the conveyor belt, or to isolate individual packages from products lined up uniformly on the entry section. Reference is also made to DE 691 92 859 and DE 1 456 521, which show such belt conveyors, each of which comprises conveyor belts having a displaceable transfer point and each comprising a chain supporting one of the conveyor belts, having evenly spaced rollers. By way of the displaceable transfer point, a certain buffer effect for the transported objects, for example, packaged food, can also be achieved here.

Document DE 10 2009 019 462 also shows such a device, with which a certain number can be picked from a row of products initially disposed at a distance from each other, and can be "pushed together" to form multipacks of a defined size. This device also makes it possible to achieve a certain "buffer" in the flow of products by temporarily holding the products back.

However, the known devices have the problem that the flexibility thereof is limited in terms of the variable length of the upper belt sections. In particular, the upper belt sections cannot be lengthened beyond a certain extent without these sagging to an unacceptable extent due to the weight of the products lying thereon. Such sagging impairs the buffering function and, primarily, the function of defined formatting.

A further problem is that the known conveyor devices have only limited suitability for transporting unpackaged foodstuffs that lie directly on the surface of the conveyor belts. Finally, all the known conveyor devices comprise a deflection roller at some point, which acts on the conveyor belt on this surface. Since the belt can become contaminated via the contact of this deflection roller, greater effort is required to maintain cleanliness and hygienic conditions.

The problem addressed by the present invention is therefore that of providing a device that can be implemented using technically simple means and that reduces the sag of the conveyor belts to a minimum and, therefore, provides increased flexibility in terms of the variable length at a high conveyance speed.

This problem is solved by the present invention.

SUMMARY OF THE INVENTION

The present invention is a device for conveying individual products (1) having, in particular, a specified dimension in a transport direction (A), wherein the device comprises two upper belt sections (2, 3), which adjoin one another at a transfer point, have a variable length in the transport direction, and each extend from an inner deflector (7, 8) formed at the transfer point (6) to an outer deflector (9, 10) formed at the other end, characterized in that the two upper belt sections (2, 3) are each supported by a plurality of support means (11) disposed at a distance from each other, the distances changing as the length of the upper belt sections (2, 3) varies.

BRIEF DESCRIPTION OF THE DRAWINGS

The invention is explained in greater detail in the following with reference to FIGS. 1 and 2. Shown are.

DETAILED DESCRIPTION OF THE INVENTION

Figure 1:
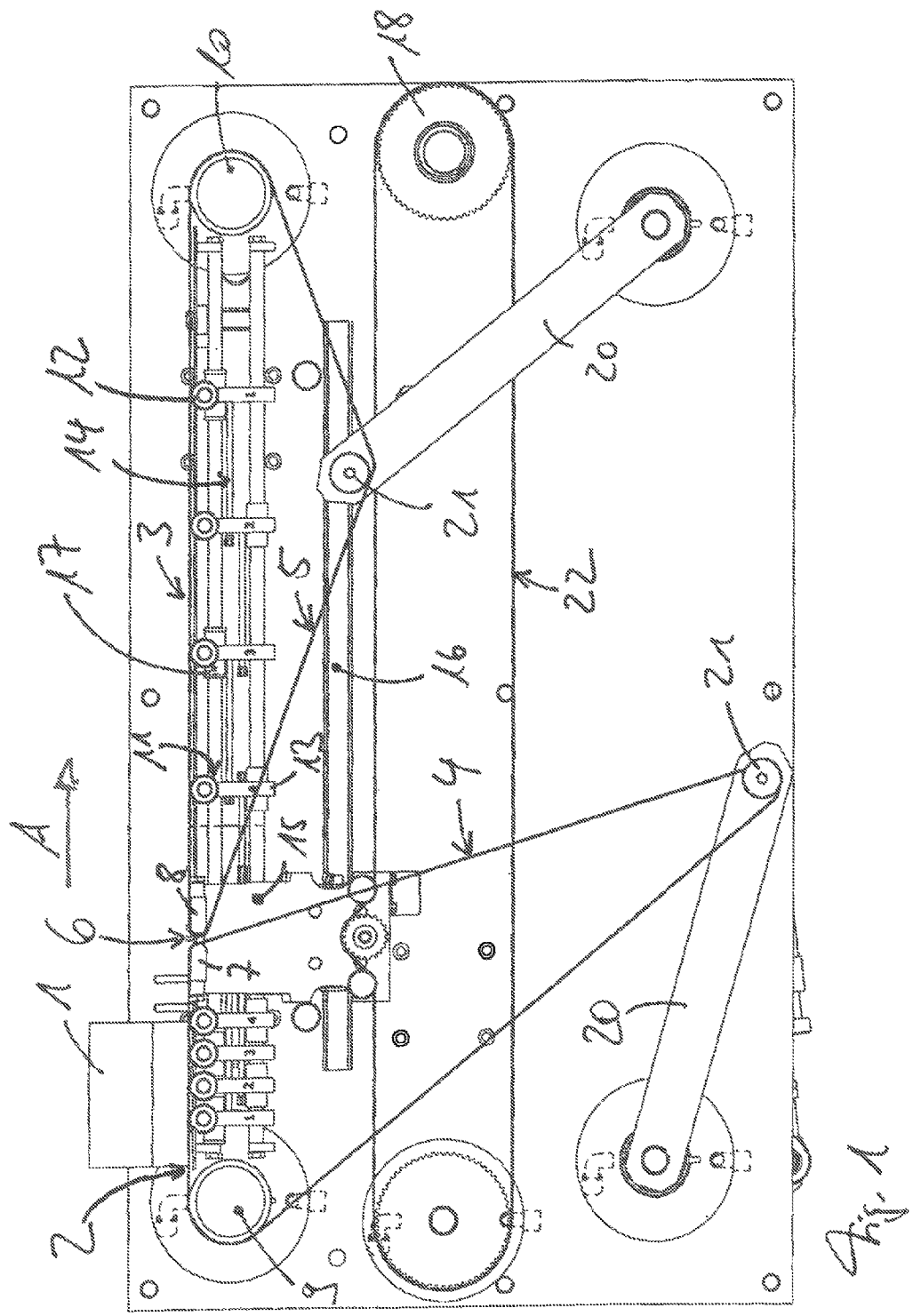
FIG. 1: a device according to the invention, in a side view.

According thereto, the invention is based on the idea of supporting the upper belt sections of the belt conveyor from below by way of support means, wherein the distance between the support means is adapted to the change in length of the upper belt sections, thereby ensuring that the upper belt sections are always provided with the most homogeneous support possible, independently of the change in length. In respect of the implementation of this inventive idea, it is initially irrelevant whether the two adjoining upper belt sections are formed by a single, appropriately redirected belt, or by two independent belts. According to the invention, the two upper sections are therefore each supported by a plurality of such support means, which are disposed at a distance from each other in the transport direction, these distances changing as the length of the upper belt sections varies. In this manner, the sag of the upper belt sections, which are loaded by the placement of the products thereon, can be effectively reduced by way of a more or less homogeneous support of said upper belt sections.

In light of a particularly high requirement on hygiene, it is advantageous for the belt conveyor to comprise two independent conveyor belts. This makes it possible to bring about the change in length of the upper belts via engagement of simple tension rollers into the lower belts, wherein these tension rollers act only on the inner sides of the conveyor belts. Such an arrangement is free of rollers that act on the conveyor belts on the side on which the product is transported. Therefore, these belt conveyors are very particularly suited for use in the food industry and, therein, for transporting unpackaged food.

Such belt conveyors that are equipped according to the invention can be used particularly advantageously to format products upstream of the packaging of formatted stacks having a defined size, for example, stacks of processed cheese slices.

With respect to minimizing the sag, it is very particularly advantageous to adapt the device in this regard to the special product to be transported, since the distances between the individual support means are limited to a maximum distance, which is as great, at most, as the length of the product lying on the upper belt section. It is thereby ensured that product is never transported without support. Therefore, for example, if stacks of processed cheese slices having square dimensions of 10 cm are transported, each upper belt section should be supported by a support means once every 10 cm at least. It is advantageous in terms of the flexibility of the device to provide as many support means as possible, of course, wherein the number thereof is limited in that these must all fit underneath an upper belt section that has been reduced to the minimum length thereof. In this respect, the support means should ideally also be designed such that they can be pushed together into the smallest possible package.

In an advantageous embodiment, in order to reduce friction, the support means have support rollers, on which the belt itself or the belt of the particular upper belt section rests. These support rollers are each rotatably mounted on a roller carrier, which is guided along a guide and is displaceable in the transport direction, and, thereon, are rotatably mounted, in particular, on a vertically oriented axis mounted on one side. In such a single-sided mounting of the support rollers, the roller carriers must be secured against rotation.

In an embodiment that has a particularly simple design and is therefore robust and easy to clean, all the roller carriers of rollers that support an upper belt section are coupled to one another via driving means, which limit the distance between any two thusly coupled roller carriers to the maximum distance. These driving means can be designed such that the roller carriers drive each other without a separate drive when the upper belt section is extended. The driving mechanism can be designed in the manner of a fan, and so, when the upper belt section is extended, the first roller carrier is driven by the motion of the transfer point, while the other roller carriers initially remain stationary. When the maximum distance is reached, in particular, the first roller carrier pulls the next roller carrier along therewith. This procedure repeats until all the roller carriers have been drawn out.

In this manner, belt support that accompanies the changing belt length is ensured. The belt support is level and symmetrical, thereby ensuring that the belt run and the product transport are not affected. Another special feature of this type of driving mechanism is that an additional drive is not required and only a small amount of force is required for the fanning-out.

In addition, to ensure smooth operation, spacers are advantageously provided between the roller carriers, which ensure that a defined minimum distance between the individual roller carriers is not fallen below when the upper belt section is shortened. Advantageously, the roller carriers and the spacers are designed such that the stack of roller carriers, in the pushed-together state, has the shortest possible length.

In all, the invention makes it possible, in a cost-effective manner, to obtain a compact and easy-to-clean design of such a belt conveyor having a variable-length belt support FIG. 1 shows a complete device ("belt conveyor") for conveying individual products, in a side view. In the present case, a stack 1 of processed cheese slices, as the product, is transported in a transport direction (arrow A). The stacks of processed cheese slices have a defined dimension of approximately 10 cm in the transport direction. The belt conveyor comprises two separate conveyor belts having variable-length upper belt sections 2 and 3, respectively, which adjoin one another at a transfer point, wherein the upper belt sections are considered to be the sections of the conveyor belts, on the surface of which the products lie, said products being the stacks of processed cheese slices in this case. In the present case, the upper belt sections 2 and 3 are formed by separate belts 4 and 5. A change in the length of the upper belt sections 2 and 3 is accompanied by a correspondingly opposite change in length of the lower belt sections 4 and 5, respectively.

The upper belt sections 2 and 3 each extend from an inner deflector formed at a displaceable transfer point 6 in the form of a rounded edge or a carried-along blade edge 7 and 8, respectively, to an outer deflector formed at the other end, which, in this case, is formed by a respective driving roller 9 and 10 over which the respective belt 4 and 5 runs. In the depiction shown, the transfer point 6 has been moved entirely to the left, and therefore the length of the upper belt section 2 of the entry belt, on which the products arrive, is shortened to the minimum. By contrast, the upper belt section 3 of the discharge belt, on which the products leave the belt conveyor, has been extended to the maximum length thereof.

As shown in FIG. 1, the change in length of the upper belt sections 2 and 3 is supported by a simple engagement of an after tension roller 21 into the respective lower belt sections 4 and 5, wherein the tension rollers 21 are partially displaceable perpendicularly to the conveyance direction, which is downward in this case. The displacement of the tension rollers 21 takes place by way of a tension means in the form of a swivellable lever 20. In the present case, the transfer point is displaced by way of a linear drive 16, which is described in the following, and therefore the variable-length lower belt sections 4 and 5 are merely held taut via the swivelleable levers 20. The tension roller 21 is held at the outer end of a lever 20 in each case and engages into the particular lower belt section 4, 5, acting only on the underside of the particular conveyor belt. The levers are deflected downward by way of a spring force generated by a pneumatic device and tension the particular lower belt section 4 or 5.

As shown, the two upper belt sections 2 and 3 are each supported by a plurality, four in this case, of support means 11 separated from each other by a distance in the transport direction, the distances changing as the length of the upper belt sections varies. The support means 11 for the entry belt are pushed together to form a stack, while the fan formed by the support means 11 on the discharge-belt side is fanned out completely, the support means 11 being separated from each other by the maximum distance. As shown, the maximum distance is shorter than the length of the product 1 to be transported on the upper belt section.

As shown in FIG. 1, the support means comprise support rollers 12, on which the particular upper belt section rests. Each support roller 12 is rotatably held on a roller carrier 13, which is guided in a guide and is displaceable in the transport direction. The roller carriers 13 are coupled via driving means in the form of sliding rods 14, which carry the next roller carrier along once the maximum distance is reached, thereby limiting the distance between any two coupled roller carriers 13 to the maximum distance. The mode of operation is such that, upon extension of the upper belt section, the roller carrier closest to the inner deflector 7, 8 follows due to the impact of the first sliding rod, while the remaining roller carriers initially remain stationary. When the first roller carrier reaches the maximum distance thereof from the second roller carrier, the latter is carried along by the sliding rod now in abutment therewith.

Spacers 17 are provided between the roller carriers 13, which ensure that a defined minimum distance between the individual roller carriers 13 is not fallen below when the upper belt section is shortened.

The fanning out or pushing together of the roller carriers 13 takes place by way of the transfer point 6, which is disposed on a carriage 15, which is displaceable in a roller-supported linear guide 16 and functions as a carrier. The carriage is driven by a toothed belt 22, which is actuated by a toothed roller 18. A displacement of the carriage induces a change in the lengths of the upper belt sections.

Figure 2:
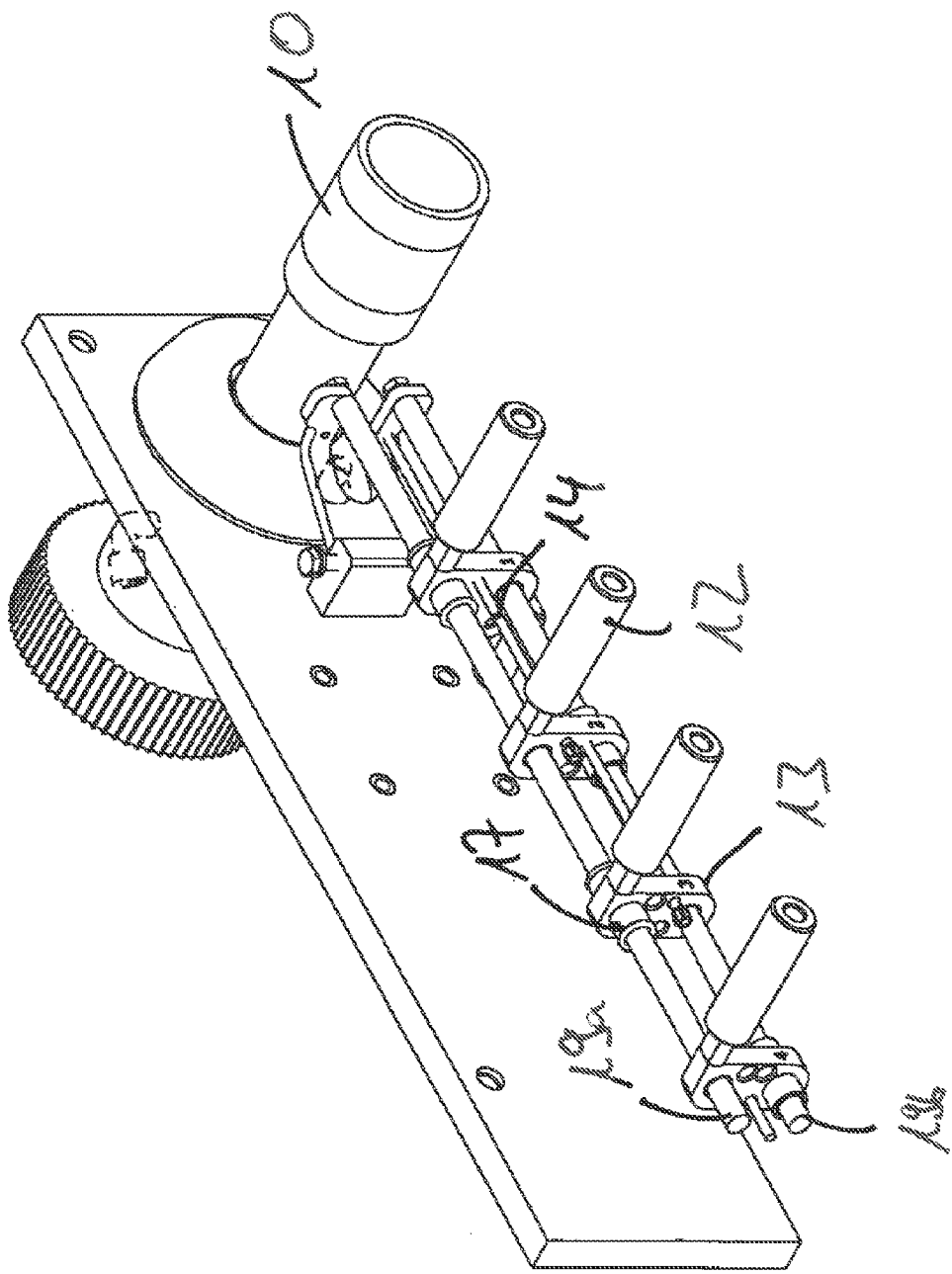
FIG. 2: a perspective view of a part of the device.

FIG. 2 shows a part of the discharge section of the belt conveyor, wherein the depiction of the belt was omitted. As shown in the figure, the roller carriers 13 slide on two round guides 19a and 19b, which are disposed one above the other. It is also shown that the support rollers 12 are each rotatably mounted via one side on a vertically oriented axis on a roller carrier 13 displaceably guided along the round guides 19. The two round guides 19a and 19b prevent the roller carriers from rotating.

A further description of preferred embodiments follows.

In a preferred embodiment, the distances between the support means (11) are limited to a maximum distance, which, in particular, is shorter than the length of the product (1) lying on the upper belt section (2, 3). The support means (11) may comprise support rollers (12), on which the particular upper belt section (2, 3) rests, wherein the support rollers (12) are each rotatably held on a roller carrier (13), which is guided in a guide and is displaceable in the transport direction.

In a further preferred embodiment, the roller carriers (13) of rollers (12) supporting one upper belt section (2, 3) are coupled via driving means (14), which limit the distance between any two coupled roller carriers (13) to the maximum distance.

In yet a further preferred embodiment, upon extension of an upper belt section (2, 3), the first roller carrier (13) closest to the inner deflector (7, 8) is the first to follow the displacement of the inner deflector (7, 8), in particular, reaching the maximum distance, while the other roller carriers (13) initially remain stationary, wherein the first roller carrier carries the second roller carrier along when the maximum distance is reached.

In yet a further preferred embodiment of the present invention, spacers (17) are provided between the roller carriers (13), which ensure that a defined minimum distance between the roller carriers (13) is not fallen below when the upper belt section (2, 3) is shortened.

The transfer point (6) preferably comprises two inner deflectors (7, 8), which are formed as deflection edges disposed on a carrier (15), which is displaceable by way of a drive, wherein a displacement of the carrier (15) induces a change in the lengths of the upper belt sections (2, 3). Two separate conveyor belts are preferably used, which form the upper belt sections (2, 3) and are each driven by a drive roller (9, 10) forming the outer deflector, wherein, when the length of the upper belt sections (2, 3) changes, the lower belt sections (4, 5), the lengths of which are changing, are each held taut by tensioning means.

The tensioning means preferably each comprise a tension roller (21), which is disposed at the end of a swivellable lever (20) and engages into the lower belt section (4, 5), wherein the levers are deflected, in particular by way of spring force, in order to generate the tension.

The invention claimed is:

1. A device for conveying discrete products having a specified dimension in a transport direction (A), wherein the device comprises:
    (a) two belts, each belt having an upper belt section (2, 3), each upper belt section (2, 3) having an inner end adjacent to the other upper belt section and an outer end at the end opposite to the inner end, the inner ends forming a transfer point (6) between the inner ends,
    (b) a pair of inner deflectors (7, 8) proximal to the transfer point (6),
    (c) a pair of outer deflectors (9, 10) at the outer ends, and
    (d) a plurality of support members (11) disposed at a distance from each other supporting the upper belt sections (2, 3),
wherein
the two upper belt sections (2, 3) are each supported by a plurality of support members (11) disposed at a distance from each other such that the distances change as the length of the upper belt sections (2, 3) varies,
the support members (11) comprise support rollers (12) on which the one of the upper belt sections (2, 3) rests, wherein the support rollers (12) are each rotatable held on a roller carrier (13), which is guided in a guide and is displaceable in the transport direction,
the roller carriers (13) of rollers (12) supporting one upper belt section (2, 3) are coupled via drivers (14), which limit the distance between any two coupled roller carriers (13) to the maximum distance and
upon extension of an upper belt section (2, 3), the first roller carrier (13) closest to the inner deflector (7, 8) is the first to follow the displacement of the inner deflector (7, 8) reaching a maximum distance, while the other roller carriers (13) initially remain stationary, wherein the first roller carrier carries the second roller carrier along when the maximum distance between the first roller carrier and the second roller carrier is reached.

2. The device according to claim 1,
wherein
spacers (17) are provided between the roller carriers (13), which ensure a defined minimum distance between the roller carriers (13) when the upper belt section (2, 3) is shortened.

3. The device according to claim 1,
wherein
the two inner deflectors (7, 8) are formed as deflection edges.

4. The device according to claim 3,
wherein
each outer deflector (9, 10) is a drive roller.

5. The device according to claim 4,
wherein
each belt is held taut by a tensioning device and each tensioning device comprises a tension roller (21), which is disposed at the end of a swivellable lever (20) and rollably engages with a lower belt section (4, 5) of one of the belts, wherein the levers are under a downward spring force to generate a downward tension.

6. The device according to claim 4,
wherein
the two inner deflectors (7, 8) are disposed on a carrier (15), which is displaceable by way of a drive (16) independent of each outer deflector (9, 10), wherein a displacement of the carrier (15) induces a change in the lengths of the upper belt sections (2, 3).

\* \* \* \* \*